(12) United States Patent
Carr et al.

(10) Patent No.: US 9,635,804 B2
(45) Date of Patent: *May 2, 2017

(54) DROP TUBE SYSTEM FOR PLANTING FIELD SEEDS IN ROWS WITH DIFFERENT VARIETIES OF SEEDS

(71) Applicant: GARY W. CLEM, INC., Nevada, IA (US)

(72) Inventors: Brian W. Carr, Ames, IA (US); Scott A. Sporrer, Nevada, IA (US); Nick Merfeld, Nevada, IA (US); Andrew G. Jenkins, Nevada, IA (US)

(73) Assignee: GARY W. CLEM, INC., Nevada, IA (US)

( * ) Notice: Subject to any disclaimer, the term of this patent is extended or adjusted under 35 U.S.C. 154(b) by 16 days.

This patent is subject to a terminal disclaimer.

(21) Appl. No.: 13/920,175

(22) Filed: Jun. 18, 2013

(65) Prior Publication Data

US 2013/0333602 A1  Dec. 19, 2013

Related U.S. Application Data

(60) Provisional application No. 61/660,865, filed on Jun. 18, 2012.

(51) Int. Cl.
*A01C 7/04* (2006.01)
*A01C 7/16* (2006.01)
*A01C 21/00* (2006.01)

(52) U.S. Cl.
CPC .............. *A01C 7/16* (2013.01); *A01C 7/04* (2013.01); *A01C 7/042* (2013.01); *A01C 21/005* (2013.01)

(58) Field of Classification Search
CPC .. A01C 7/00; A01C 7/04; A01C 7/042; A01C 7/044; A01C 7/046; A01C 7/08; A01C 7/081; A01C 7/082; A01C 7/084; A01C 7/10; A01C 7/102; A01C 7/105; A01C 7/12; A01C 7/123; A01C 7/125; A01C 7/127; A01C 7/128; A01C 7/14; A01C 7/16; A01C 7/163; A01C 7/20; A01C 7/206; A01C 21/005; A01C 21/00
USPC ................. 111/171, 170, 14, 200, 900, 903
See application file for complete search history.

(56) References Cited

U.S. PATENT DOCUMENTS

| 3,995,885 | A  | * | 12/1976 | Plesniarski ................. 297/474 |
| 6,474,500 | B1 |   | 11/2002 | Carr et al. |
| 6,591,766 | B2 |   | 7/2003  | Williames |
| 6,634,306 | B1 |   | 10/2003 | Faulring |
| 6,928,941 | B1 |   | 8/2005  | Sternitzke |
| 6,990,911 | B2 |   | 1/2006  | Schneider |
| 7,905,186 | B2 |   | 3/2011  | Faulring et al. |
| 7,954,439 | B2 |   | 6/2011  | Faulring et al. |
| 2003/0159631 | A1 | * | 8/2003 | Sauder et al. ............... 111/171 |

(Continued)

FOREIGN PATENT DOCUMENTS

FR          2638054  A1  *  4/1990  ............. A01C 7/042

*Primary Examiner* — Christopher J Novosad
(74) *Attorney, Agent, or Firm* — Zarley Law Firm, P.L.C.

(57) ABSTRACT

A system for planting seeds having a metering system positioned before a belt lowering system that has a sensor to detect the position of a seed on the belt lowering system. The rotational speed of the metering system and the belt lowering system are determined by the speed and location of a planter and the position of the seed on the belt lowering system to correct seed positioning with relation to a pre-mapped or selected field starting location.

5 Claims, 3 Drawing Sheets

(56) References Cited

U.S. PATENT DOCUMENTS

| | | |
|---|---|---|
| 2011/0046776 A1 | 2/2011 | Goldman et al. |
| 2011/0120356 A1* | 5/2011 | Wendte .................. A01C 7/046 111/130 |
| 2011/0179982 A1 | 7/2011 | Faulring |

* cited by examiner

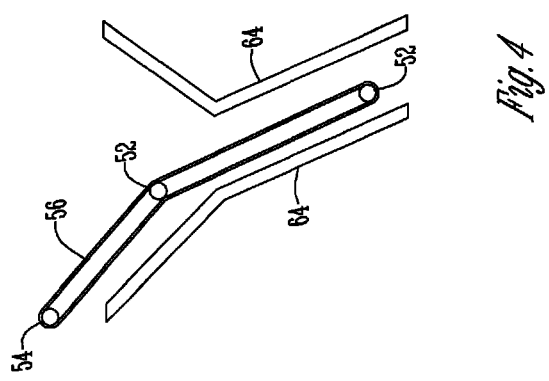
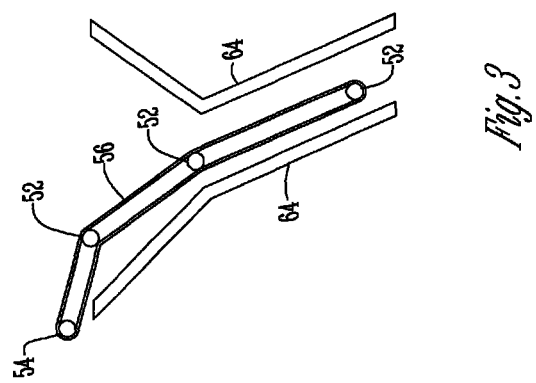

DROP TUBE SYSTEM FOR PLANTING FIELD SEEDS IN ROWS WITH DIFFERENT VARIETIES OF SEEDS

CROSS REFERENCE TO RELATED APPLICATION

This application claims the benefit of U.S. Provisional Application No. 61/660,865 filed Jun. 18, 2012.

BACKGROUND OF THE INVENTION

This invention relates to devices associated with planting experimental crops. More specifically, this invention is related to a drop tube system for planting an experimental crop.

In research fields for hybrid seeds and the like, the seeds of different varieties and spacing are planted in short parallel rows in given plots interrupted by alleys that extend across a field perpendicular to the rows. The managing and planting of different seeds in different rows in different plots is difficult at planting time especially when planting is conducted by a row type planter moving through the field at a speed close to six miles per hour. This process is complicated if varying seed sizes are used in the research plots.

In the art of hybrid seeds, in experimental planting precision in planting the rows of crops is extremely important. In order to provide the most accurate test results planting rows of crops to ensure that the rows align properly is of great importance. To this end, many improvements have been made throughout the years regarding the timing of dropping seeds in order to ensure that they are dropped at a precise time to ensure the distance between such seeds is precise. At this time GPS devices are utilized in order to attempt to determine the exact location of a seed drop. Still, problems remain.

A traditional seed metering device or other dispenser similar to U.S. Pat. No. 6,474,500 is used to singulate seeds for planting in a row. The singulation and release of seed is normally tied to ground travel to create specific seed spacings in the ground. This dispensing device is normally coupled to a drop tube that delivers the seed to the ground via gravity. The problem with this device is the seeds will strike the sidewalls of the tube and lose speed during this portion of their travel. This results in erratic spacing in the ground depending on the contact and severity of impact on the tube. This drop distance also lets the seed accelerate via gravity which results in a high speed impact with the ground causing further variation in spacing due to the seeds bounce or roll. Thus, there is a need to ensure that the orientation of the kernel is accurate and no bounce of the seed occurs to ensure precision planting.

In addition, it is critical to singulate seed for planting and it is especially difficult to endeavor to singulate the seeds in the field or during the planting process.

Therefore, a principal object of the present invention is to provide a dropping tube system that increases the precision of seed planting.

Yet another object of the present invention is to provide a seed drop tube that minimizes the probability of a seed bouncing.

SUMMARY OF THE INVENTION

A system for planting seeds having a metering system positioned before a belt lowering system that has a sensor to detect the position of a seed on the belt lowering system. A belt lowering system and a second sensor is positioned at the outlet end of the belt lowering system. The rotational speed of the metering system and the belt lowering system are determined by the speed and location of a planter and the position of the seed on the belt lowering system in relationship to pre-mapped or selected field starting location.

BRIEF DESCRIPTION OF THE DRAWINGS

FIG. 3 is a side view of a belt lowering system;
and
FIG. 4 is a side view of belt lowering system.

DESCRIPTION OF THE PREFERRED EMBODIMENT

Figure 1:
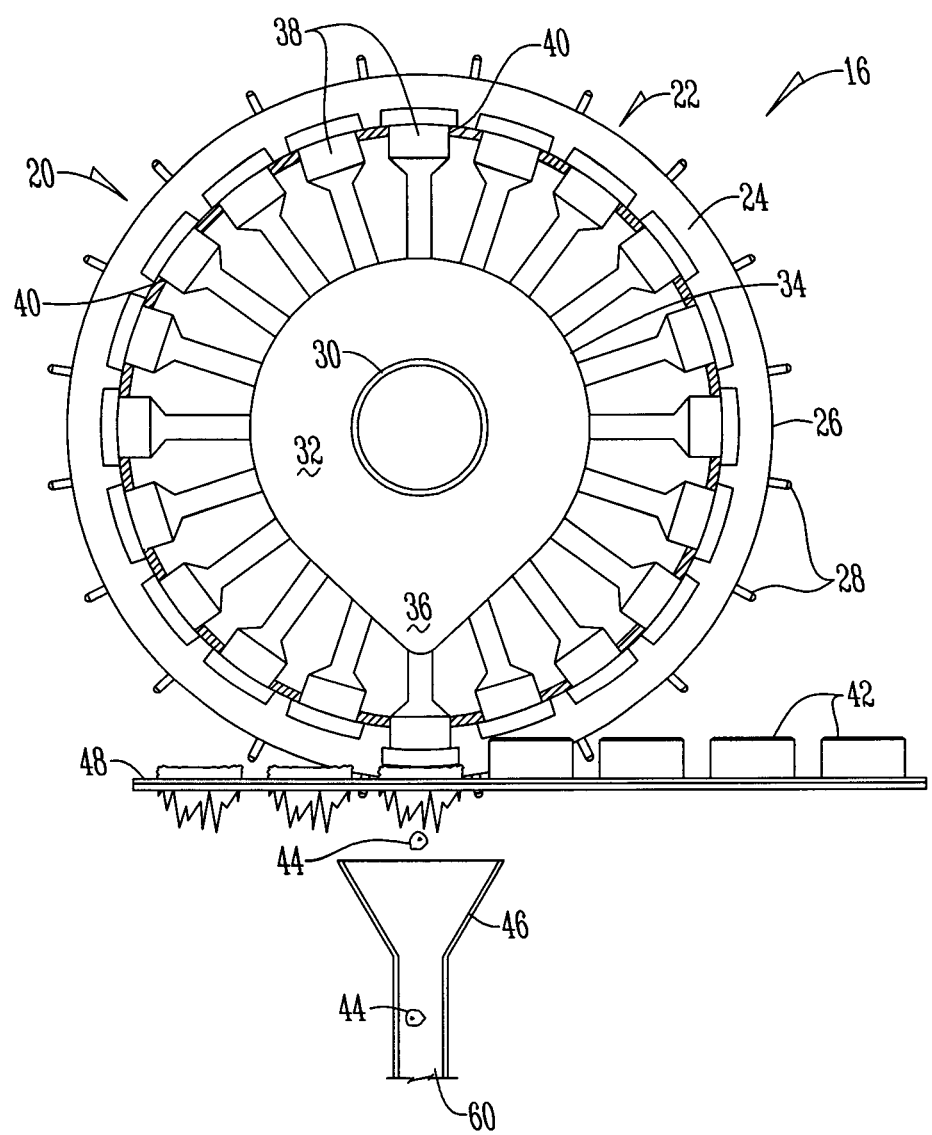
FIG. 1 is a side view of a metering system.
Figure 2:
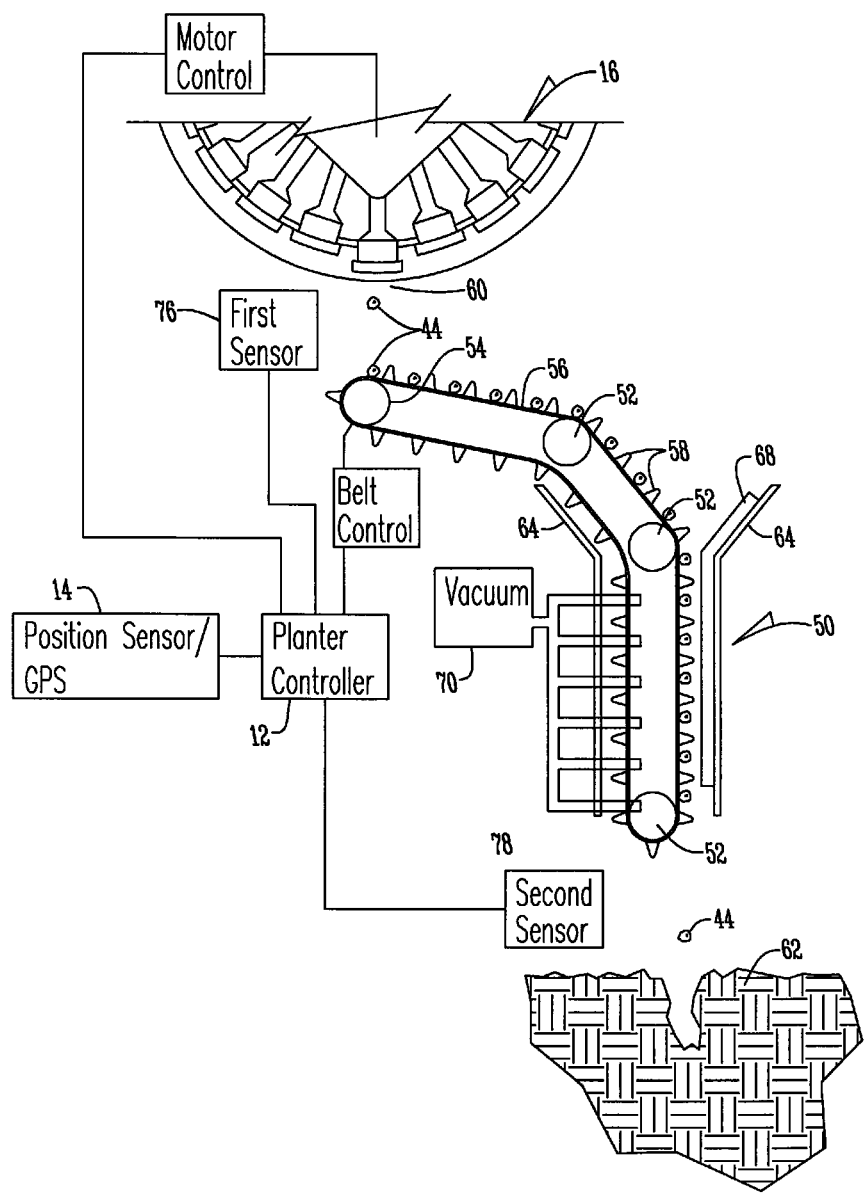
FIG. 2 is a side view of drop tube system.

Referring to the Figures, a drop tube system 50 is mounted to a planter that traverses across a field in order to plant seed. The planter includes a controller 12 that is electrically connected to a position sensor 14 such as a GPS device, or another sensor on the frame of the planter or tractor and the like that provide information regarding the relative ground speed of the planter. Each planter additionally has a metering system 16 that includes an opening for receiving seed. A typical metering system 16 and seed transportation system is shown in U.S. Pat. No. 6,474,500 that is incorporated herein. Such a system in one embodiment includes a punch wheel 20 that is located laterally downstream from a discharge opening in a magazine. The punch wheel 20 is comprised of a circular drum 22 that has vertical side flanges 24 secured to a vertical plane on opposite sides of the drum. The flanges have peripheral edges 26 from which pins 28 extend.

A center shaft 30 extends through the wheel 20 and is operatively connected in any convenient way to a motor. A stationary cam 32 is rotatably mounted on the shaft 30 and slidably between flanges 24 and is rigidly supported by any sleeve and key means so that the wheel can rotate with respect to the stationary cam. Sleeve and key means are rigidly connected to any stationary frame (not shown). The cam 32 has a circular cam surface 34 which essentially around the periphery of the cam to be interrupted only by a radially extending cam 36 element which is located at a six o'clock position. A plurality of radially extending pistons 38 extend through apertures 40 in the drum 22 and are slidably mounted therein.

When the pistons 38 are in their normal position they protrude only slightly through the drum 22 to the outside surface of the drum 22. Retaining springs (not shown) can be used in conjunction with pistons 38 to normally maintain their dormant position when the inner ends of the piston 38 are engaged with circular cam surface 34. When the pistons engage the cam element 36 at the six o'clock position, the cam element 36 exerts radial pressure on the inner ends of the pistons 38 and forces the pistons outwardly through the apertures 40 to engage and crush the cell 42 of a cell pack 48 longitudinally extending there below to force the seed to the individual cell 42 downwardly through the bottom base layer 48 to be deposited in a seed delivery tube 46 of a seed planting mechanism. Thus a belt element is used to deliver seed to the delivery or drop tube. While described as part of a metering system, any belt element 48 or other seed metering mechanism may be used to deliver seed to the drop tube 46 without falling outside the scope of this invention.

A belt lowering system 50 is mounted to the planter after the metering system 16. The belt lowering system 50 includes a plurality of idler rolls 52 and a driven roll 54. A continuous belt 56 having flights 58 is positioned around rolls 52 and 54. The rolls 52 and 54 are positioned such that the belt 56 transitions from a generally horizontal portion adjacent the outlet 60 of the metering device to a generally vertical portion or any orientation of belt geometry to deliver seed that extends to within a few inches of a planting furrow 62.

Guide members 64 are positioned on both sides of at least a portion of the belt 56 in spaced parallel relation. The guide members 64 include a layer of foam 68 to compress and control the position of the seed 44 against the belt 56. Alternatively, a suction element 70 such as a vacuum or the like to hold and control the seed 44 against the belt 56. In yet another embodiment, a second belt 56 is positioned adjacent the first belt 56 to hold and control the seed 44 between the belts 56. The belts could be smooth instead of celled.

While the exit end of the belt 56 is positioned near the ground to reduce seed 44 bounce and roll, the bounce and roll may be further reduced by having the lower portion of belt 56 angled rearwardly in a straight or arcuate manner so that seed 44 exits at an angle to accommodate for the speed of the planter instead of being dropped vertically.

Positioned between the outlet 60 of the metering device 16 and the inlet of belt 56 is a first seed sensor 76 that detects an initial position of a seed 44 on the belt 56 and positioned at the outlet of the belt 56 is a second belt sensor 78 that detects the position of the seed 44 when deposited. Both seed sensors 76 and 78 and the driving source for the belt 56 (not shown) are connected to controller 12.

In operation, as the planter traverses across a field, the speed and position of the planter are detected by sensor 14 and determined by controller 12. Based upon this information, controller 12, which is connected to the metering system 16 activates the seed meter 16 and belt 56. The seed meter 16 deposits a seed 44 onto belt 56. First seed sensor 76 detects the position of the seed 44 on the belt and this information is stored in controller 12. The belt transports the seed 44 to the output end of the belt 56 where the seed is deposited on the ground. The position of where the seed 44 is deposited on the ground is detected by the second seed sensor 78 and this information is stored by controller 12.

The rotational speed of the belt 56 and the seed metering device 16 are controlled by controller 12 based upon the detected speed of the planter, the position of the seed on the belt 56, and the position of the planter in the field.

Thus, a device has been disclosed that at the very least meets all the stated objectives.

What is claimed:

1. A drop tube system for planting seeds, comprising:
   a metering system;
   a belt lowering system positioned after the metering system and having a continuous belt positioned around a plurality of rolls; and
   a controller connected to the metering system and a driving source of the continuous belt configured to control a rotational speed of the continuous belt and the seed metering system such that initial and deposit positions of a seed are determined and stored by the controller.

2. The system of claim 1 further comprising a vacuum to hold and control a seed against the continuous belt.

3. The system of claim 1 wherein the controlled rotational speed of the continuous belt and the metering system are based upon a detected speed of a planter, a position of a seed on the belt, and a position of the planter in the field.

4. The system of claim 1 further comprising a sensor positioned at an outlet end of the belt lowering system.

5. The system of claim 1 further comprising, a sensor positioned between an outlet of the seed metering system and an inlet of the continuous belt.

* * * * *